United States Patent
Yokoyama (10) Patent No.: US 10,658,809 B2
(45) Date of Patent: May 19, 2020

(54) OPTICAL POWER MONITORING DEVICE, LASER DEVICE, AND LASER SYSTEM

(71) Applicant: FUJIKURA LTD., Tokyo (JP)

(72) Inventor: Yoshitaka Yokoyama, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/301,677

(22) PCT Filed: Feb. 22, 2017

(86) PCT No.: PCT/JP2017/006624
§ 371 (c)(1),
(2) Date: Nov. 14, 2018

(87) PCT Pub. No.: WO2017/199508
PCT Pub. Date: Nov. 23, 2017

(65) Prior Publication Data
US 2019/0296515 A1    Sep. 26, 2019

(30) Foreign Application Priority Data
May 16, 2016 (JP) .................................. 2016-097630

(51) Int. Cl.
*H01S 3/06* (2006.01)
*H01S 3/067* (2006.01)
(Continued)

(52) U.S. Cl.
CPC ............ *H01S 3/06754* (2013.01); *G01J 1/02* (2013.01); *G01J 1/0422* (2013.01);
(Continued)

(58) Field of Classification Search
CPC ........ H01S 3/06754; H01S 3/067; H01S 3/00; G01J 1/42; G01J 1/02; G01J 1/44;
(Continued)

(56) References Cited

U.S. PATENT DOCUMENTS

2006/0013532 A1   1/2006 Wan
2009/0160833 A1 * 6/2009 Brown ..................... G09G 3/02
                                                        345/207

(Continued)

FOREIGN PATENT DOCUMENTS

CN           1734987 A      2/2006
CN         102844942 A     12/2012
(Continued)

*Primary Examiner* — Tony Ko
(74) *Attorney, Agent, or Firm* — Osha Liang LLP (57) ABSTRACT

An optical power monitoring device that monitors power of input light reflected back into an optical fiber among output light output from the optical fiber, the optical power monitoring device includes: a photodetector disposed by the optical fiber that detects Rayleigh scattered light generated by the input light and the output light that are guided by the optical fiber; and a calculator that performs a calculation to exclude a component that corresponds to an output of the output light detected by the photodetector using first information that indicates a relationship between an output of the output light obtained in advance under a condition where the output light is not reflected and the output of the output light detected by the photodetector.

11 Claims, 7 Drawing Sheets

(51) Int. Cl.
  *G01J 1/04* (2006.01)
  *G01J 1/42* (2006.01)
  *G01J 1/44* (2006.01)
  *G01J 1/02* (2006.01)
  *H01S 3/00* (2006.01)

(52) U.S. Cl.
  CPC ............... *G01J 1/0425* (2013.01); *G01J 1/42* (2013.01); *G01J 1/4257* (2013.01); *G01J 1/44* (2013.01); *H01S 3/00* (2013.01); *H01S 3/067* (2013.01); *G01J 2001/4446* (2013.01)

(58) Field of Classification Search
  CPC ...... G01J 1/4257; G01J 1/0425; G01J 1/0422; G01J 2001/4446; G01J 1/10
  See application file for complete search history.

(56) References Cited

U.S. PATENT DOCUMENTS

| | | |
|---|---|---|
| 2013/0242379 A1 | 9/2013 | Atlas et al. |
| 2014/0313513 A1 | 10/2014 | Liao |
| 2015/0144791 A1* | 5/2015 | Simpkin .............. G01N 21/359 |
| | | 250/339.07 |
| 2019/0257688 A1* | 8/2019 | Balamurugan ....... G01J 1/0295 |

FOREIGN PATENT DOCUMENTS

| | | |
|---|---|---|
| CN | 103854722 A | 6/2014 |
| JP | 2015-525342 A | 9/2015 |
| JP | 5865977 B1 | 2/2016 |
| JP | 2016-075556 A | 5/2016 |
| JP | 2016-076598 A | 5/2016 |
| WO | 2006/077588 A3 | 7/2006 |
| WO | 2014/035505 A2 | 3/2014 |

* cited by examiner

OPTICAL POWER MONITORING DEVICE, LASER DEVICE, AND LASER SYSTEM

CROSS-REFERENCE TO RELATED APPLICATIONS

This application claims priority to Japanese Patent Application No. 2016-097630, filed May 16, 2016, the contents of which are incorporated herein by reference in their entirety.

TECHNICAL FIELD

The present invention relates to an optical power monitoring device, a laser device, and a laser system.

BACKGROUND

In recent years, fiber lasers have attracted attention in various fields such as a processing field, an automobile field, a medical field, and the like. This fiber laser is superior to conventional laser devices (for example, a carbon dioxide gas laser device) in terms of beam quality and light condensing property. Therefore, compared to conventional laser devices, the fiber laser has superior features in that a time required for processing can be shortened, energy saving can be achieved, high-quality microfabrication can be easily performed, and the like. Further, since fiber lasers do not require components for spatial optics, fiber lasers have advantages in that alignment or the like is unnecessary, maintenance is unnecessary, or the like.

On the other hand, when reflected light (for example, reflected light from a processing surface of a workpiece) returns to the fiber laser, an oscillation state of the fiber laser becomes unstable. As a result, there is a likelihood that the power of output light fluctuates and processing properties deteriorate. Further, when such unstable oscillation develops to random pulse oscillation, failure in an excitation light source, breakage of fiber, or the like may be caused and the possibility of failure in the fiber laser is also conceivable. Therefore, it is necessary to monitor the power of reflected light to prevent the oscillation state from becoming unstable.

The following Patent Document 1 discloses a conventional device and method for monitoring the power of reflected light. Specifically, the following Patent Document 1 discloses a device that monitors the power of reflected light or the like, which includes a first detector for detecting output light leaked at a fusion-splicing point of an optical fiber and a second detector for detecting reflected light leaked at a fusion-splicing point of the optical fiber, by performing a calculation of excluding an influence of the output light from the detection result of the second detector using a relationship between detection results of the first detector and the second detector obtained in advance under a condition in which reflected light is not generated.

PATENT DOCUMENTS

[Patent Document 1] Japanese Patent No. 5865977

SUMMARY

By the way, when the device disclosed in Patent Document 1 described above or the like is used, it is considered to be able to simply detect a magnitude of reflected light. However, in the device disclosed in the above-described Patent Document 1 or the like, a relationship between the power of reflected light returned to the fiber laser and a detection result of the second detector (detector for detecting reflected light) is not actually obtained. For this reason, there is no quantitativeness in a detection value, and when higher accuracy is required in the future, there is a likelihood that the requirement cannot be satisfied.

Here, if the above-described relationship is previously obtained in the device disclosed in the above-described Patent Document 1 or the like, it is also considered to be able to meet the requirement for improvement in accuracy described above. However, it is considered that obtaining the above-described relationship by making light incident on the fiber laser as reflected light after completion of the fiber laser requires many additional man-hours such as for evaluation of the device after performing irregular splicing.

One or more embodiments of the present invention provide an optical power monitoring device, a laser device, and a laser system capable of improving monitoring accuracy of reflected light with a simple configuration.

An optical power monitoring device according to one or more embodiments of the present invention is an optical power monitoring device (13) that monitoring the power of reflected light (L2 or L12) input to an optical fiber (F or F10) among reflected light of output light (L1 or L11) output from the optical fiber, and includes: a photodetector (21) that is disposed near the optical fiber and detects Rayleigh scattered light of light guided by the optical fiber; and a calculation unit (22) (calculator) that performs a calculation of excluding a component corresponding to an output of the output light from a detection result obtained by the photodetector using first information (IF2) indicating a relationship between an output of the output light obtained in advance under a condition in which the reflected light is not generated and a detection result of the photodetector.

In the optical power monitoring device of one or more embodiments, the calculation unit obtains an output of the output light in accordance with a current supplied to an excitation light source using second information (IF1) indicating a relationship between the current supplied to the excitation light source of the output light obtained in advance under the condition in which the reflected light is not generated and an output of the output light.

In the optical power monitoring device of one or more embodiments, the calculation unit includes a storage unit (M) in which the first information and the second information are stored.

In the optical power monitoring device of one or more embodiments, the calculation unit obtains a difference between the second information newly obtained under the condition in which the reflected light is not generated and the second information stored in the storage unit to correct a calculation result using the difference.

In the optical power monitoring device of one or more embodiments, the calculation unit masks a detection result of the photodetector in at least one of: a predetermined time after supply of a current to the excitation light source is started; and a predetermined time after the supply is stopped.

In the optical power monitoring device of one or more embodiments, when the optical fiber has a splicing point (P), the photodetector is disposed at a position a predetermined distance away from the splicing point in a longitudinal direction of the optical fiber.

A laser device according to one or more embodiments of the present invention is a laser device (1 or 2) having a transmission optical fiber (F) functioning as a transmission medium through which light is transmitted, and includes any one of the optical power monitoring devices described above which monitors the power of reflected light (L2) input to the transmission optical fiber as the power of reflected light input to the optical fiber.

The laser device of one or more embodiments further includes an excitation light source (EL), and an amplification optical fiber (F1) functioning as an amplification medium with respect to light that is output from the excitation light source, and is a fiber laser device which transmits light from the amplification optical fiber through the transmission optical fiber.

A laser system of one or more embodiments is a laser system (LS) having a plurality of laser devices (31), a multiplexing device (32) which multiplexes light that is output from the plurality of laser devices, and an output optical fiber (F10) which guides light multiplexed in the multiplexing device, and includes any one of the above-described optical power monitoring devices which monitor the power of reflected light (L12) input to the output optical fiber as the power of reflected light input to the optical fiber.

The laser system of one or more embodiments further includes a control device (33) which performs control of lowering an output of the plurality of laser devices when power of the reflected light monitored by the optical power monitoring device exceeds a predetermined threshold value.

In the laser system according to one or more embodiments of the present invention, each of the plurality of laser devices is the above-described laser device.

According to one or more embodiments of the present invention, since a component corresponding to an output of the output light is excluded from a detection result obtained by the photodetector (detection result of Rayleigh scattered light) using the first information (information indicating a relationship between an output of the output light and a detection result of the photodetector) obtained in advance, there is an effect of increasing monitoring accuracy of reflected light with a simple configuration.

DETAILED DESCRIPTION

Hereinafter, an optical power monitoring device, a laser device, and a laser system according to embodiments of the invention will be described in detail with reference to the drawings.

Figure 1:
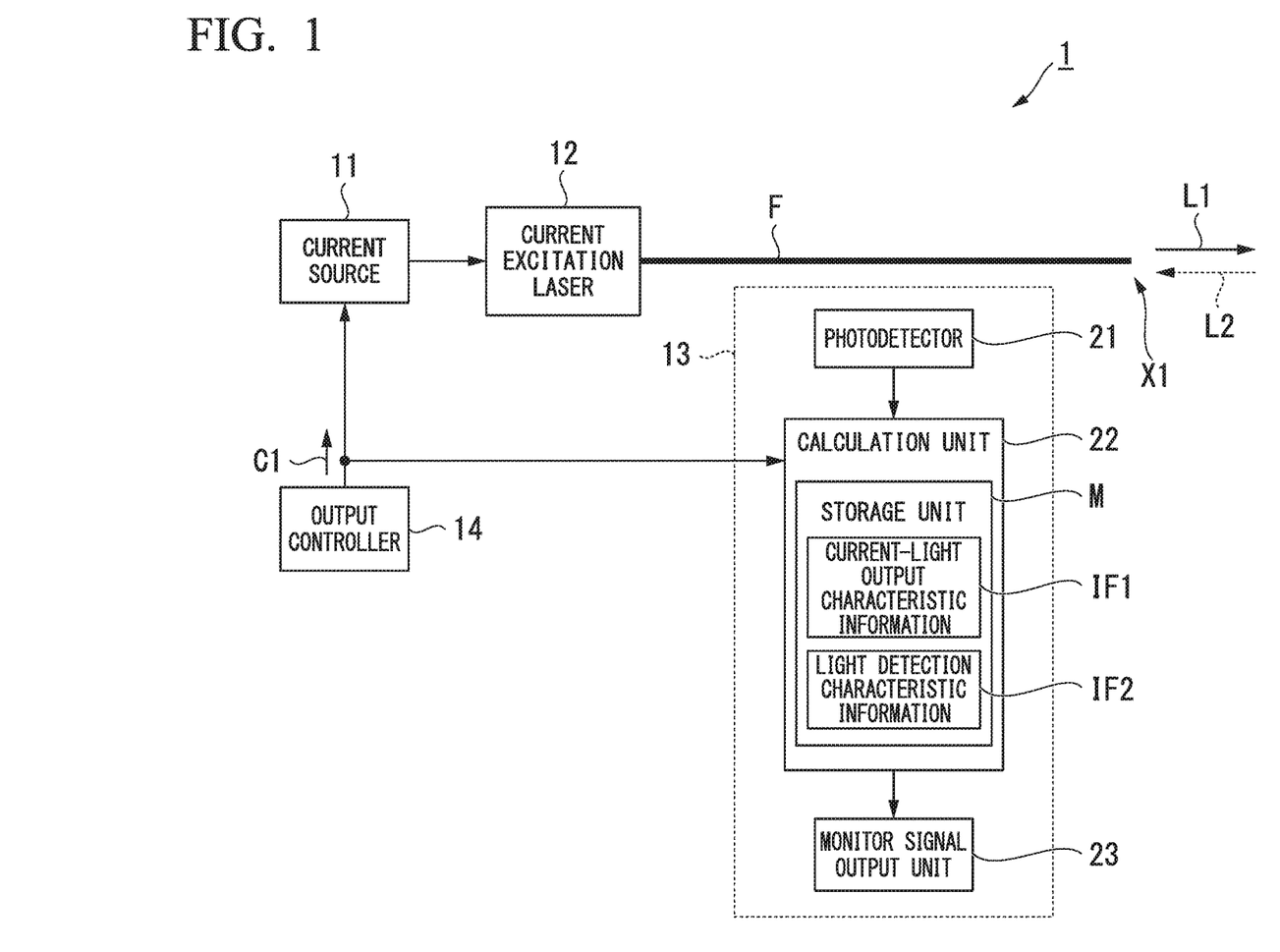
FIG. 1 is a block diagram showing a configuration of a main portion of a laser device according to one or more embodiments of the present invention.

FIG. 1 is a block diagram showing a configuration of a main portion of a laser device according to one or more embodiments of the present invention.

As shown in FIG. 1, the laser device 1 of one or more embodiments includes an optical fiber F (optical fiber for transmission) functioning as a transmission medium, a current source 11, a current excitation laser 12, an optical power monitoring device 13, an output controller 14. Such a laser device 1 outputs output light L1 (laser light) from an output end X1 of the optical fiber F and detects the power of reflected light L2 incident on the output end X1 of the optical fiber F among reflected light of the output light L1 under control of the output controller 14. The wavelength of the output light L1 emitted from the laser device 1 is, for example, 1080 (nm).

The optical fiber F is a single clad fiber having a core and a cladding surrounding the core. As the optical fiber F, for example, an optical fiber having a core diameter of 50 ($\mu$m) and a cladding diameter of 400 ($\mu$m) can be used. One end of the optical fiber F is optically coupled to the current excitation laser 12 and the other end thereof is the output end X1 of the output light L1.

The current source 11 supplies an excitation current for exciting the current excitation laser 12 to the current excitation laser 12 under control of the output controller 14. Specifically, the current source 11 supplies an excitation current corresponding to a current control signal C1 output from the output controller 14 to the current excitation laser 12. Further, the current control signal C1 from the output controller 14 is output to the current source 11 and also to the optical power monitoring device 13.

The current excitation laser 12 includes, for example, a plurality of semiconductor lasers, and is excited by an excitation current supplied from the current source 11 to output laser light. The type and the number of the semiconductor lasers provided in the current excitation laser 12 are appropriately selected according to a wavelength and power of the output light L1. Here, since one end of the optical fiber F is coupled to the output end of the current excitation laser 12 as described above, the laser light output from the current excitation laser 12 is incident on the optical fiber F and guided by the optical fiber F.

The optical power monitoring device 13 includes a photodetector 21, a calculation unit 22 (calculator), and a monitor signal output unit 23, and detects the power of reflected light L2 incident on the output end X1 of the optical fiber F among reflected light of the output light L1 output from the output end X1 of the optical fiber F. That is, the optical power monitoring device 13 detects the power of the reflected light L2 guided in the optical fiber F in a direction opposite to a direction of the output light L1 (from the output end X1 toward the current excitation laser 12).

The photodetector 21 is disposed near the optical fiber F and detects Rayleigh scattered light among the light guided by the optical fiber F. Here, the Rayleigh scattered light has a power corresponding to the power of the light guided by the optical fiber F irrespective of directions of the light guided in the optical fiber F. Therefore, the photodetector 21 detects the Rayleigh scattered light corresponding to the power of the output light L1 and the Rayleigh scattered light corresponding to the power of the reflected light L2 which are guided by the optical fiber F.

As the photodetector 21, for example, a PIN photodiode can be used.

When a PIN photodiode is used as the photodetector 21, the photodetector 21 is disposed, for example, at a position separated from a side surface of the optical fiber F (from a cladding resin) by approximately several millimeters (mm). Further, the photodetector 21 can be disposed at an arbitrary position as long as the Rayleigh scattered light among the light guided by the optical fiber F can be detected without being affected by a disturbance (for example, stray light or the like).

The calculation unit 22 performs a predetermined calculation on a detection result obtained by the photodetector 21 and detects the power of the reflected light L2 incident on the output end X1 of the optical fiber F. Specifically, the calculation unit 22 obtains the power of the output light L1 in accordance with the current control signal C1 from the output controller 14, and performs calculation of excluding a component corresponding to the power of the output light L1 from a detection result obtained by the photodetector 21 to detect the power of the reflected light L2. The calculation unit 22 performs the above-described calculation using current-light output characteristic information IF1 (second information) and light detection characteristic information IF2 (first information) which are stored in a storage unit M such as a nonvolatile memory.

Figure 2A:
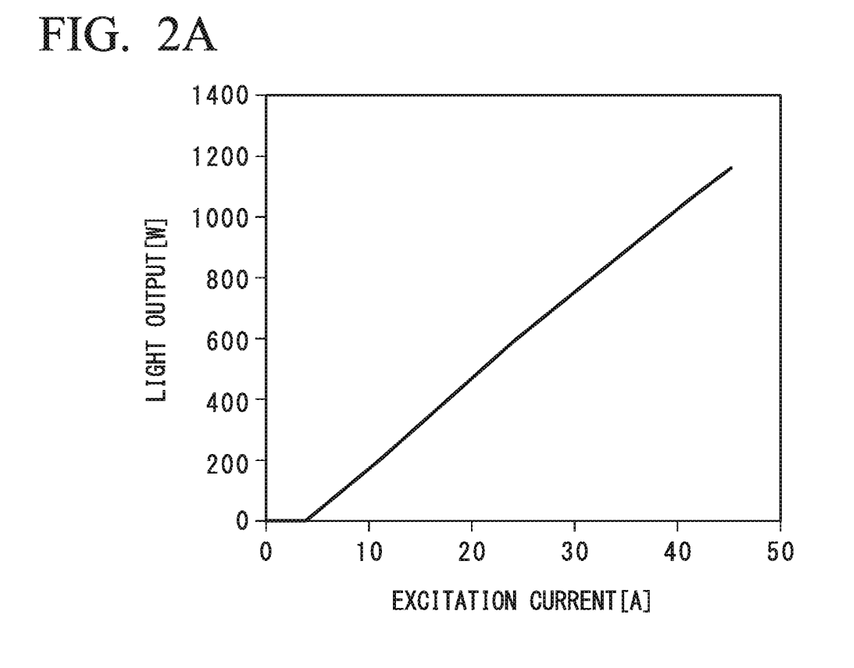
FIG. 2A is a view showing an example of characteristic information used in one or more embodiments of the present invention.
Figure 2B:
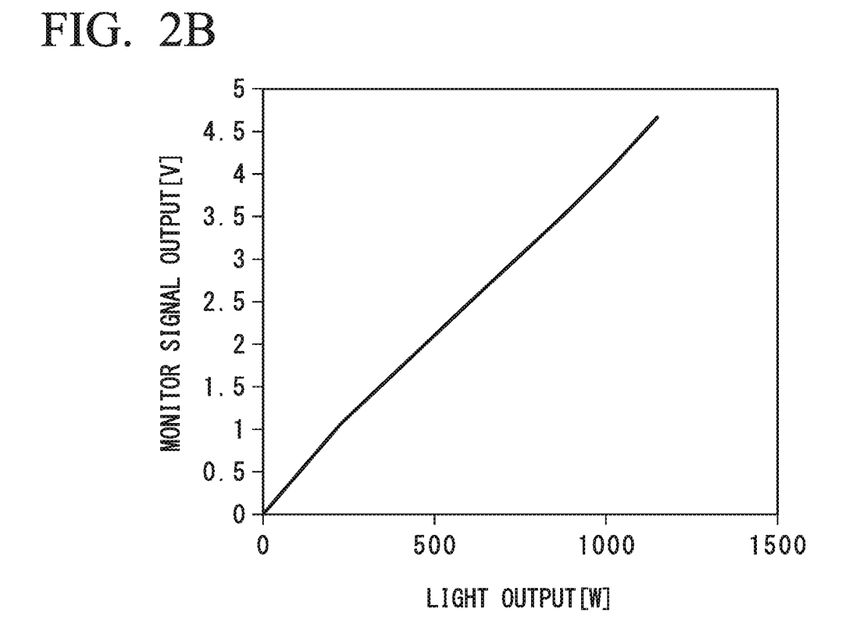
FIG. 2B is a view showing an example of characteristic information used one or more embodiments of the present invention.

FIGS. 2A and 2B are views showing an example of characteristic information used in one or more embodiments of the present invention. FIG. 2A is a graph showing an example of the current-light output characteristic information IF1 and FIG. 2B is a graph showing an example of the light detection characteristic information IF2. The current-light output characteristic information IF1 shown in FIG. 2A is information indicating a relationship between an excitation current (A) supplied to the current excitation laser 12 and an light output (W) of the laser device 1 (power of the output light L1). Also, the light detection characteristic information IF2 shown in FIG. 2B(b) is information indicating a relationship between an light output (W) of the laser device 1 (power of the output light L1) and an output (V) of the photodetector 21 (monitor signal output). The light detection characteristic information IF2 can also be referred to as information indicating a relationship between a light output of the laser device 1 and a monitoring result of the Rayleigh scattered light generated in the optical fiber F.

These pieces of characteristic information have been obtained in advance using, for example, a power monitor under a condition in which reflected light of the output light L1 is not generated. Specifically, under the condition in which reflected light of the output light L1 is not generated, a power monitor that monitors the power of the output light L1 actually output from the laser device 1 is installed. Then, while changing an excitation current supplied to the current excitation laser 12 by the current control signal C1 from the output controller 14, a monitoring result of the power monitor and an output of the photodetector 21 (monitor output signal) are obtained. The current-light output characteristic information IF1 shown in FIG. 2A is obtained by associating the current control signal C1 with the monitoring result of the power monitor, and the light detection characteristic information IF2 shown in FIG. 2B(b) is obtained by associating the monitoring result of the power monitor with the output of the photodetector 21 (monitor output signal).

In FIG. 2A, an excitation current and a light output have the following relationship. That is, when an excitation current is equal to or less than a certain threshold current (approximately several amperes (A)), since laser oscillation is not generated in the current excitation laser 12, a light output is zero. When the excitation current is larger than the above-described threshold current, laser oscillation is generated in the current excitation laser 12, and the light output increases substantially in proportion to an amount of the excitation current. Using such current-light output characteristic information IF1 as described above, the calculation unit 22 obtains the power of the output light L1 in accordance with the current control signal C1 from the output controller 14.

In FIG. 2B, the light output and the monitor signal output have a relationship in which the monitor signal output also increases in accordance with an increase in the light output, and the monitor signal output also decreases in accordance with a decrease in the light output. However, the relationship between the light output and the monitor signal output is not a perfect proportional relation, and deviates from a perfect proportional relationship due to characteristics of the photodetector 21. Using such light detection characteristic information IF2 as described above, the calculation unit 22 performs calculation for excluding a component corresponding to the power of the output light L1 from the detection result (monitor signal output) obtained by the photodetector 21 and obtains the power of the reflected light L2.

The monitor signal output unit 23 outputs information indicating the power of the reflected light L2 obtained by the calculation unit 22 to the outside. For example, the monitor signal output unit 23 includes a display device such as a liquid crystal display device, and displays information indicating the power of the reflected light L2 obtained by the calculation unit 22 on the display device. Alternatively, the monitor signal output unit 23 includes an external output terminal, and outputs a signal (monitor signal) indicating the power of the reflected light L2 obtained by the calculation unit 22 to the outside from the external output terminal.

The output controller 14 controls the power of the output light L1 output from the laser device 1. Specifically, the output controller 14 controls the power of the output light L1 output from the laser device 1 by outputting the current control signal C1 to the current source 11 that supplies an excitation current to the current excitation laser 12. Further, the output controller 14 controls the power of the output light L1 output from the laser device 1 in accordance with an instruction input from an input unit (not shown).

Next, operation of the laser device 1 having the above-described configuration will be described. When operation is started by an instruction to start the operation of the output controller 14 or the like, the current control signal C1 is output from the output controller 14 to the current source 11, and an excitation current corresponding to the current control signal C1 is supplied from the current source 11 to the current excitation laser 12. When the excitation current supplied to the current excitation laser 12 is larger than the above-described threshold current (approximately several amperes (A)), laser oscillation is generated in the current excitation laser 12, and laser light is output from the current excitation laser 12.

The laser light (output light L1) output from the current excitation laser 12 is enters the optical fiber F from one end of the optical fiber F, is guided by the optical fiber F, and is then output from the output end X1 of the optical fiber F.

Here, when a workpiece or the like is disposed in front of the output end X1, some of the reflected light generated on a processing surface of the workpiece is input to the optical fiber F from the output end X as the reflected light L2. The reflected light L2 is guided by the optical fiber F in a direction opposite to the output light L1.

At this time, the output light L1 is guided by the optical fiber F in a rightward direction as viewed in FIG. 1 and the reflected light L2 is guided in a leftward direction as viewed in FIG. 1. Therefore, inside the optical fiber F, Rayleigh scattered light according to the power of the output light L1 and Rayleigh scattered light according to the power of the reflected light L2 are generated. Therefore, both the Rayleigh scattered light according to the power of the output light L1 and the Rayleigh scattered light according to the power of the reflected light L2 are detected by the photodetector 21 of the optical power monitoring device 13.

Figure 3:
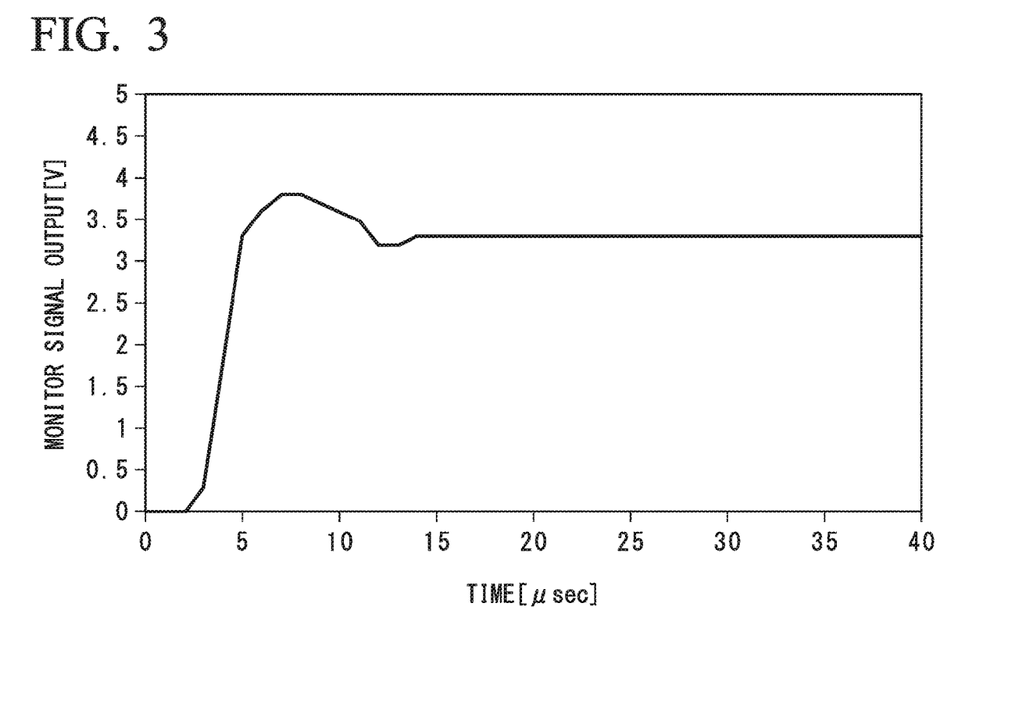
FIG. 3 is a view showing an example of a change over time in a monitor signal output that is output from a photodetector in one or more embodiments of the present invention.

FIG. 3 is a view showing an example of a change over time in a monitor signal output that is output from the photodetector in one or more embodiments of the present invention. In the graph shown in FIG. 3, the horizontal axis represents time, and the vertical axis represents a monitor signal output. A time point at which operation of the laser device 1 is started is time 0 in the graph shown in FIG. 3. In FIG. 3, it can be seen that the monitor signal output rapidly rises at a time point after several microseconds (μsec) have elapsed since the operation start point of the laser device 1, and the monitor signal output is substantially constant (approximately 3.3 (V)) after approximately 15 (μsec) have elapsed since the operation start point of the laser device 1.

When such a monitor signal output indicating a change over time is input to the calculation unit 22, the calculation unit 22 performs calculation for obtaining a light intensity (a light intensity of the output light L1 and reflected light L2) of the light guided by the optical fiber F using the light detection characteristic information IF2 stored in the storage unit M. In addition, the calculation unit 22 performs calculation for obtaining the light intensity of the output light L1 in accordance with the current control signal C1 from the output controller 14 using the current-light output characteristic information IF1 stored in the storage unit M.

Then, calculation of excluding the light intensity of the output light L1 obtained using the current-light output characteristic information IF1 from the light intensity obtained using the light detection characteristic information IF2 is performed. Therefore, the light intensity (power) of the reflected light L2 is obtained. Information indicating the light intensity (power) of the reflected light L2 obtained in the manner described above is output from the calculation unit 22 to the monitor signal output unit 23, displayed on a display device provided in the monitor signal output unit 23, or is output to the outside from an external output terminal provided in the monitor signal output unit 23.

Figure 4A:
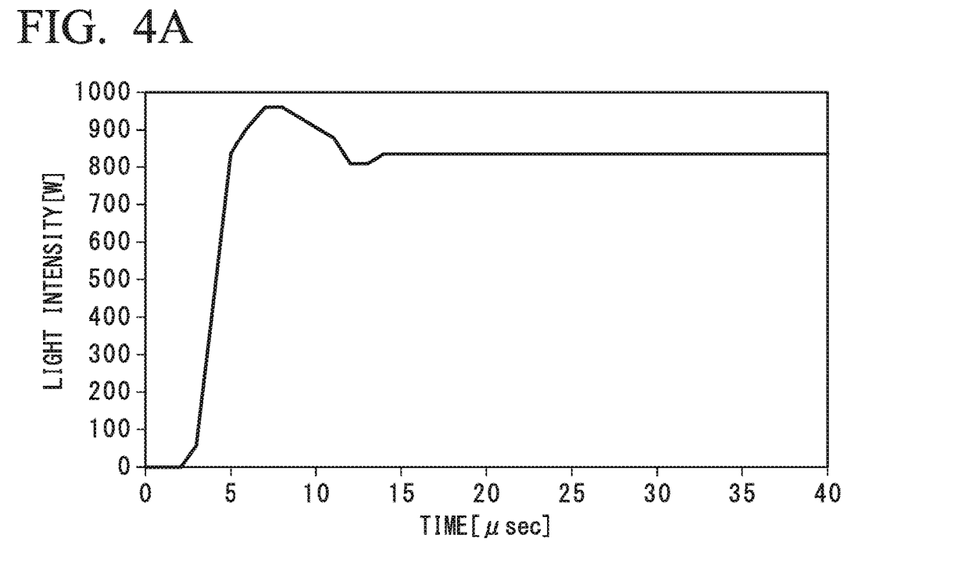
FIG. 4A is a view showing an example of a change over time in light intensity obtained by calculation in one or more embodiments of the present invention.
Figure 4B:
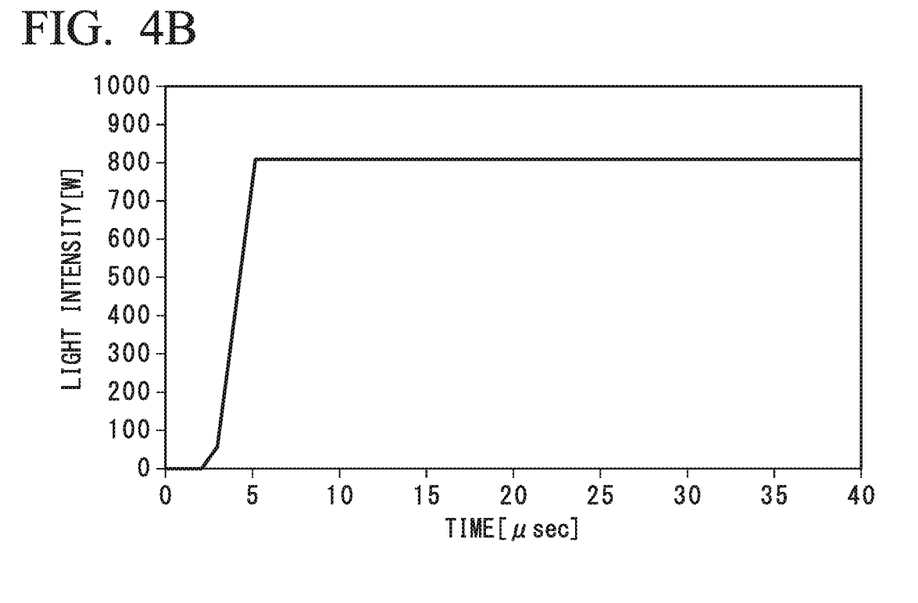
FIG. 4B is a view showing an example of a change over time in light intensity obtained by calculation in one or more embodiments of the present invention.
Figure 4C:
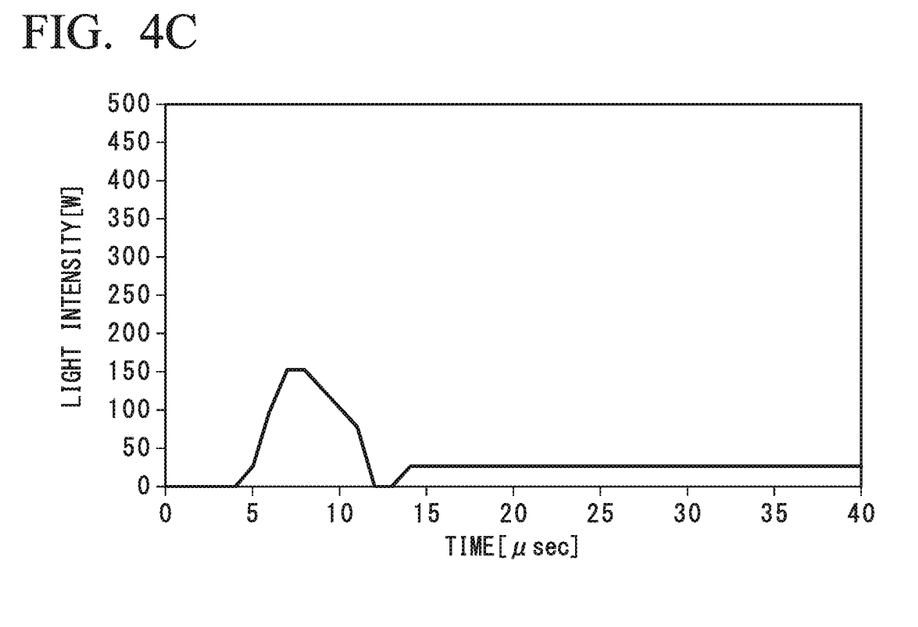
FIG. 4C is a view showing an example of a change over time in light intensity obtained by calculation in one or more embodiments of the present invention.

FIGS. 4A to 4C are views showing an example of a change over time in light intensities obtained by calculation in one or more embodiments of the present invention. FIG. 4A is a view showing a change over time in the light intensity of the output light L1 and reflected light L2 obtained using the light detection characteristic information IF2. FIG. 4B is a view showing a change over time in the light intensity of the output light L1 obtained in accordance with the current control signal C1 using the current-light output characteristic information IF1. FIG. 4C is a view showing a change over time in the light intensity of the reflected light L2 obtained by calculation of excluding the light intensity of the output light L1 obtained using the current-light output characteristic information IF1 from the light intensity obtained using the light detection characteristic information IF2. Horizontal axes of the graphs shown in FIGS. 4A to 4C are the same as the horizontal axis of the graph shown in FIG. 3.

First, in FIG. 4A, the light intensity of the output light L1 and reflected light L2 rapidly rises at a time point when several microseconds (μsec) have elapsed since the operation start point of the laser device 1 and becomes approximately 950 (W) maximally. Thereafter, the light intensity of the output light L1 and reflected light L2 is lowered to approximately 800 (W), and is substantially constant (approximately 820 (W)) after approximately 15 (μsec) have elapsed since the operation start point of the laser device 1. Therefore, the change over time in light intensity of the output light L1 and reflected light L2 obtained by the calculation unit 22 using the light detection characteristic information IF2 is substantially the same as that of the monitor signal output shown in FIG. 3.

Next, in FIG. 4B, the light intensity of the output light L1 rapidly rises at a time point when several microseconds (μsec) have elapsed since the operation start point of the laser device 1, and is substantially constant (800 (W)) after approximately 5 (μsec) have elapsed since the operation start point of the laser device 1. Next, in FIG. 4C, the light intensity of the reflected light L2 starts to rise at a time point when the light intensity of the output light L1 becomes constant (a time point approximately 5 (μsec) since the operation start point of the laser device 1), becomes 150 (W) maximally, and then becomes approximately zero at a time point when ten-odd (μsec) have elapsed since the operation start point of the laser device 1. Thereafter, it is substantially constant (approximately 30 (W)).

In FIG. 4C, the reason why light intensity of the reflected light L2 rises at a time point when approximately 5 (μsec) have elapsed since the operation start point of the laser device 1 is because, although the intensity of the output light L1 is maximized (see FIG. 4B), since a workpiece is not processed and a surface condition of the workpiece is close to a flat surface, a large amount of the reflected light L2 is input to the optical fiber F from the output end X. Thereafter, the reason why the light intensity of the reflected light L2 decreases is because the surface condition of the workpiece changes when the workpiece begins to be processed and thus the reflected light L2 input to the optical fiber F from the output end X decreases. As described above, in one or more embodiments, it can be seen that the reflected light L2 can be monitored with high accuracy.

As described above, in one or more embodiments, calculation of obtaining the light intensity of the output light L1 and reflected light L2 from the monitor output signal of the photodetector 21 using the light detection characteristic information IF2 is performed, and calculation of obtaining the light intensity of the output light L1 in accordance with the current control signal C1 from the output controller 14 using the current-light output characteristic information IF1 is performed. Then, the light intensity (power) of the reflected light L2 is obtained by performing a calculation of excluding the light intensity of the output light L1 obtained using the current-light output characteristic information IF1 from the light intensity obtained using the light detection characteristic information IF2. Accordingly, since the reflected light L2 can be monitored with high accuracy, the monitoring accuracy of the reflected light L2 can be improved.

In the above-described embodiments, an example in which the calculation unit 22 obtains the light intensity of the reflected light L2 by performing the calculations shown in the following (A) to (C) has been described.

(A) A calculation of obtaining a light intensity of the output light L1 and reflected light L2 from the monitor output signal of the photodetector 21 using the light detection characteristic information IF2.

(B) A calculation of obtaining a light intensity of the output light L1 in accordance with the current control signal C1 using the current-light output characteristic information IF1.

(C) A calculation of excluding the light intensity of the output light L1 from the light intensity of the output light L1 and reflected light L2.

However, the calculation unit 22 may obtain the light intensity of the reflected light L2 by performing the calculations shown in the following (a) to (d), for example.

(a) A calculation of obtaining a light intensity of the output light L1 in accordance with the current control signal C1 using the current-light output characteristic information IF1.

(b) A calculation of obtaining a monitor output signal which would be obtained if the output light L1 having the light intensity obtained in the above-described (a) was detected by the photodetector 21, using the light detection characteristic information IF2.

(c) A calculation of excluding the monitor output signal obtained in (b) from the monitor output signal of the photodetector 21.

(d) A calculation of converting the calculation result of (c) described above into a light intensity.

Next, a positional relationship between a fusion-splicing point (splicing point) of the optical fiber F and the photodetector 21 will be reviewed. Since Rayleigh scattered light is generated everywhere in the optical fiber F, when there is no fusion-splicing point, it is possible to dispose the photodetector 21 at an arbitrary position in a longitudinal direction of the optical fiber F. However, since the Rayleigh scattered light generated inside the optical fiber F has a low intensity, when there is a fusion-splicing point, the photodetector 21 needs to be disposed away from the fusion-splicing point at which a large amount of leakage light is generated.

Figure 5:
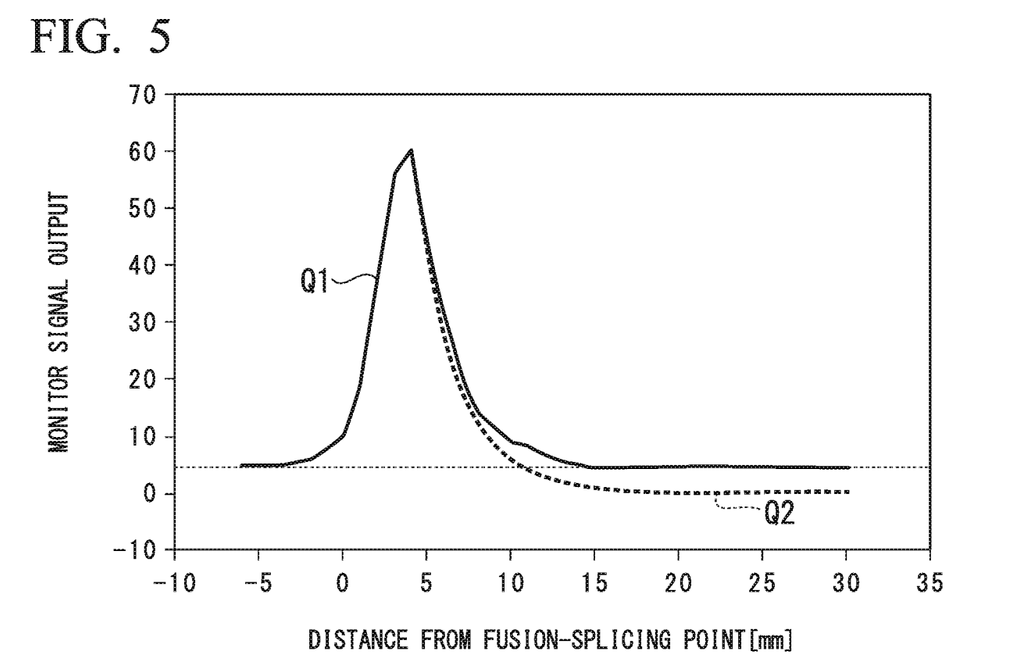
FIG. 5 is a view showing an example of a result of acquiring a monitor output signal of the photodetector while changing a distance from a fusion-splicing point.

FIG. 5 is a view showing an example of a result of acquiring a monitor output signal of the photodetector while changing a distance from a fusion-splicing point. In the graph shown in FIG. 5, the horizontal axis represents a distance from a fusion-splicing point, and the vertical axis represents a monitor output signal obtained from the photodetector 21. In the graph shown in FIG. 5, a direction in which a distance from the fusion-splicing point increases (a direction from left to right as viewed in the graph) is a direction in which the output light L1 advances.

A curve Q1 shown in FIG. 5 is a curve showing actually measured values of the monitor output signal obtained from the photodetector. Since the output light L1 advances in the direction from left to right as viewed in the graph, as shown in FIG. 5, a peak of the curve Q1 appears at a position shifted from the fusion-splicing point (a position at which the distance is 0 (mm)) to the right-hand side (a position at which the distance is approximately 4 (mm) in the example shown in FIG. 5) as viewed in the graph. Also, since the leakage light from the fusion-splicing point is not guided by the optical fiber F, the leakage light is rapidly attenuated at a distance of approximately several millimeters (mm) as shown in FIG. 5.

A curve Q2 shown in FIG. 5 is a curve obtained by fitting the attenuation portion of the monitor output signal (a portion in which the monitor output signal decreases). This curve Q2 is one obtained when an attenuation coefficient is set to 4 (cm$^{-1}$). That is, from this curve Q2, it was found that the attenuation coefficient at the attenuation portion of the curve Q1 is 4 (cm$^{-1}$). Also, referring to the curve Q2, it can be seen that an intensity of the leakage light from the fusion-splicing point becomes approximately zero at a position approximately 10 (mm) or more away from the peak position.

Further, referring to the curve Q1 shown in FIG. 5, it can be seen that the monitor output signal does not become zero, but becomes a certain value or more indicated by a broken line in the figure. This is thought to be a component of Rayleigh scattered light generated inside the optical fiber F. As described above, it is thought that, when the photodetector 21 is disposed at a position several centimeters (cm) away in a longitudinal direction of the optical fiber F from the fusion-splicing point of the optical fiber F (a position separated by a predetermined distance), Rayleigh scattered light can be detected with high accuracy without being influenced by the leakage light from the fusion-splicing point.

Here, the Rayleigh scattered light generated in the optical fiber F is generated when light guided by the optical fiber F is subjected to Rayleigh scattering inside the optical fiber F irrespective of a core or a cladding of the optical fiber F. Rayleigh scattered light is scattered light caused by minute fluctuations in refractive index equal to less than a wavelength of light, and the Rayleigh scattered light has no directivity and is generated uniformly in all directions (however, when the scattered light is coupled to a waveguide mode, the scattered light eventually has directivity).

In contrast, leakage light described above is light leaked to the outside of the optical fiber among light leaked from a core to a cladding at a discontinuous point such as a fusion-splicing point, and is not guided through the optical fiber. The leakage light becomes non-wave-guided light from wave-guided light due to refractive index discontinuity of substantially a wavelength or more, a spatial distribution of a light intensity thereof is localized near a discontinuous point, and the leakage light has a directivity corresponding to an advancing direction of the wave-guided light. Further, the light intensity of Rayleigh scattered light is, for example, slightly less than approximately 1/10 of a peak value of the leakage light.

In one or more embodiments, although Rayleigh scattered light of the wave-guided light guided by the core of the optical fiber F is detected by the photodetector 21, the photodetector 21 is installed at a position at which it is not affected by leakage light. Specifically, the photodetector 21 is installed at a position sufficiently away from the fusion-splicing point of the optical fiber F or the like in a longitudinal direction of the optical fiber F (for example, a position several centimeters (cm) away from the fusion-splicing point or the like). Further, it can be said that Patent Document 1 (Japanese Patent No. 5865977) in which leakage light described above is detected is essentially different from the one or more embodiments where Rayleigh scattered light is detected.

First Modified Example

In the laser device 1 described above, a relationship between an excitation current supplied to the current excitation laser 12 and a light output (power of the output light L1) of the laser device 1 was obtained in advance as the current-light output characteristic information IF1, and the power of the reflected light L2 was obtained using the relationship. When a change in characteristics of the laser device 1 (for example, a change over time) occurs, there is a likelihood that the above relationship may change and detection accuracy of the reflected light L2 may deteriorate. In the present modified example, the monitoring accuracy of the reflected light L2 is maintained even when such a change in characteristics of the laser device 1 occurs.

In the present modified example, after operation of the laser device 1 is started, under a condition in which reflected light of the output light L1 is not generated, the current-light output characteristic information IF1 indicating a relationship between an excitation current supplied to the current excitation laser 12 and a light output (power of the output light L1) of the laser device 1 is newly obtained and stored in the storage unit M of the calculation unit 22. Then, after performing the same calculation as in the above-described embodiments to obtain the power of the reflected light L2, a difference between the newly obtained current-light output characteristic information IF1 and the original current-light output characteristic information IF1 is obtained, and the calculation unit 22 performs a calculation for correcting the power of the reflected light L2 using the difference. By performing such correction, monitoring accuracy of the reflected light L2 is maintained even when characteristics of the laser device 1 changes. Further, it is desirable to regularly perform the process of newly obtaining the current-light output characteristic information IF1.

Second Modified Example

In the laser device 1 described above, a large amount of current is supplied from the current source 11 to the current excitation laser 12 immediately after the operation is started, and as a result, the light intensity of the output light L1 increases rapidly as shown in FIG. 4B. When power of the reflected light L2 is obtained using such a portion at which the current changes rapidly, there is a likelihood that the power of the reflected light L2 may be erroneously detected. In the present modified example, erroneous detection of the power of the reflected light L2 is inhibited by masking such a portion at which the current changes rapidly.

Specifically, in the present modified example, a change in the current control signal C1 is detected, and the calculation unit 22 performs a process of masking the current control signal C1 when an amount of change exceeds a certain threshold value. Alternatively, a process of masking the monitoring signal output that is output from the photodetector 21 is performed in at least one of a predetermined time after supply of a current to the current excitation laser 12 is started and a predetermined time after the supply of the current is stopped. While the current control signal C1 is masked or while the monitor signal output is masked, the calculation unit 22 does not perform the calculation of obtaining the power of the reflected light L2. When such processing is performed, erroneous detection of the power of the reflected light L2 can be inhibited.

Figure 6:
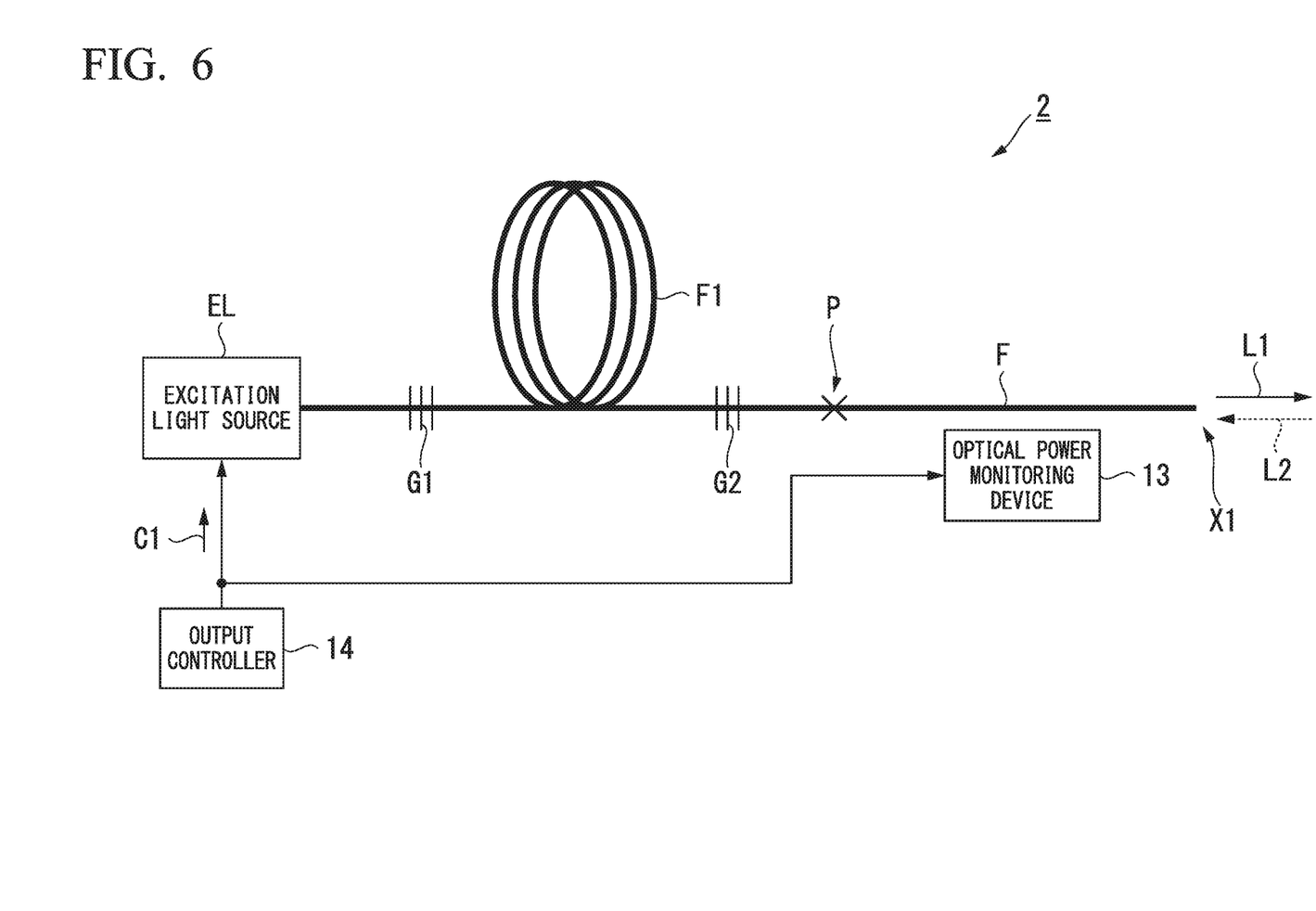
FIG. 6 is a block diagram showing a configuration of a main portion of a laser device according to one or more embodiments of the present invention.

FIG. 6 is a block diagram showing a configuration of a main portion of a laser device according to one or more embodiments of the invention.

In FIG. 6, components corresponding to the components shown in FIG. 1 are denoted by the same reference numerals. As shown in FIG. 6, a laser device 2 of one or more embodiments is a fiber laser device including an optical fiber F1 functioning as an amplification medium (amplification optical fiber), an optical fiber F functioning as a transmission medium (transmission optical fiber), an excitation light source EL, an optical power monitoring device 13, and an output controller 14. Such a laser device 2 outputs output light L1 (laser light) from an output end X1 of the optical fiber F, and detects the power of reflected light L2 (laser light) incident on the output end X1 of the optical fiber F among reflected light of the output light L1.

The optical fiber F1 functioning as an amplification medium is a single clad fiber having a core to which active elements are added and a cladding surrounding the core. The optical fiber F1 amplifies light propagating through the core of the optical fiber F1 by the active elements excited due to excitation light supplied from the excitation light source EL. In this optical fiber F1, fiber Bragg gratings G1 and G2 in which a refractive index of the core is periodically changed are formed. Therefore, the light propagating through the core of the optical fiber F1 is amplified while being repeatedly reflected by the two fiber Bragg gratings G1 and G2. Further, one end of the optical fiber F1 is fusion-spliced to one end of the optical fiber F, and a splicing point thereof is referred to as a fusion-splicing point P.

The excitation light source EL includes, for example, a plurality of semiconductor lasers, and supplies excitation light to the optical fiber F under control of the output controller 14. The optical power monitoring device 13 is the same as the optical power monitoring device 13 shown in FIG. 1. However, in one or more embodiments, since there is the fusion-splicing point P between the optical fiber F1 and the optical fiber F2, the optical power monitoring device 13 is disposed at a position a predetermined distance away from the fusion-splicing point P in a longitudinal direction of the optical fiber F (for example, a position separated by several centimeters (cm)). Specifically, the distance between the fusion-splicing point P and the optical power monitoring device 13 is set to a distance that satisfies the above-described expression (1). The output controller 14 is the same as the output controller 14 shown in FIG. 1.

Next, operation of the laser device 2 having the above-described configuration will be described. When operation is started by an instruction to start the operation of the output controller 14 or the like, a current control signal C1 is output from the output controller 14 to the excitation light source EL, and therefore excitation light is output from the excitation light source EL.

When the excitation light output from the excitation light source EL is incident on the optical fiber F1, the active elements added to the core of the optical fiber F1 are excited. Light propagating through the core of the optical fiber F1 is amplified due to the excited active elements while being reflected by the fiber Bragg gratings G1 and G2 formed in the optical fiber F1, causing laser oscillation to occur, and therefore the output light L1 which is laser light is output from the optical fiber F1.

The output light L1 is guided by the optical fiber F and then is output from the output end X1.

Here, when a workpiece or the like is disposed in front of the output end X1, some of the reflected light generated on a processing surface of the workpiece is input to the optical fiber F from the output end X as reflected light L2. The reflected light L2 is guided by the optical fiber F in a direction opposite to the output light L1. Inside the optical fiber F, Rayleigh scattered light corresponding to the power of the output light L1 and Rayleigh scattered light corresponding to the power of the reflected light L2 are generated and detected by a photodetector 21 of the optical power monitoring device 13. This detection result is output to the calculation unit 22, and calculation similar to that in one or more embodiments described-above is performed to obtain the power of the reflected light L2.

As described above, the laser device 2 of one or more embodiments includes the optical fiber F1 or the like functioning as an amplification medium, and thus is slightly different in configuration from the laser device 1 described in one or more embodiments above. However, the laser device 2 includes the same optical power monitoring device 13 as that included in the laser device 1, and the same calculation as that described in one or more embodiments above is performed. Therefore, in one or more embodiments, since the reflected light L2 can be monitored with high accuracy, the monitoring accuracy of the reflected light L2 can be improved.

Figure 7:
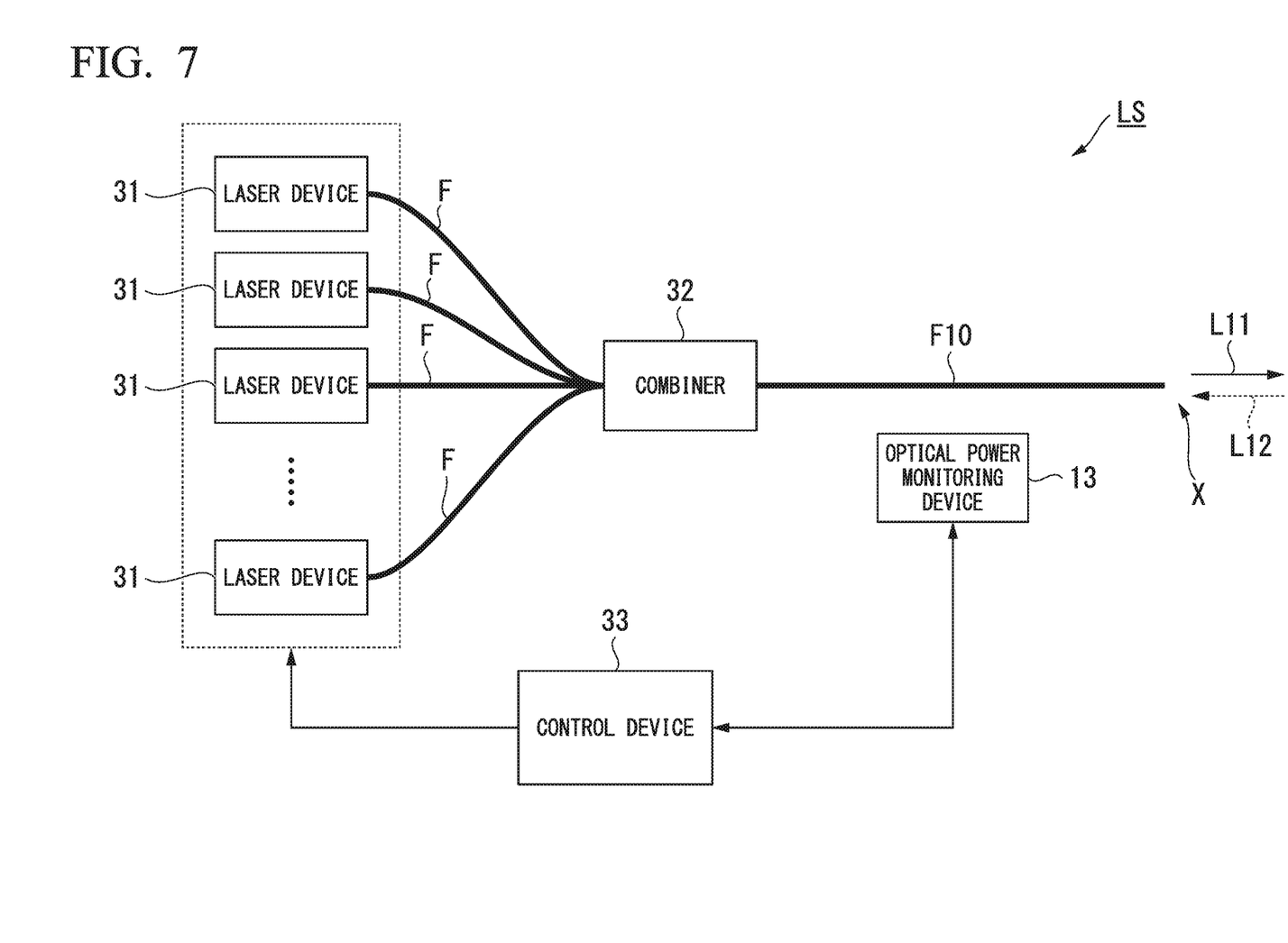
FIG. 7 is a block diagram showing a configuration of a main portion of a laser system according to one or more embodiments of the present invention.

FIG. 7 is a block diagram showing a configuration of a main portion of a laser system according to one or more embodiments of the present invention. As shown in FIG. 7, a laser system LS of one or more embodiments includes a plurality of laser devices 31, a combiner 32 (multiplexing device), an optical fiber F10 (output optical fiber), an optical power monitoring device 13, and a control device 33 (controller). Such a laser system LS outputs output light L11 (laser light) from the output end X of the optical fiber F10, and detects the power of reflected light L12 incident on the output end X of the optical fiber F among reflected light of the output light L11.

Each of the laser devices 31 is a device that outputs laser light under control of the control device 33. As the laser device 31, any one of the laser device 1 shown in FIG. 1 and the laser device 2 shown in FIG. 6 can be used. Further, the laser device 31 is not limited to the laser device 1 shown in FIG. 1 and the laser device 2 shown in FIG. 6, and any device can be used as long as it outputs laser light.

The combiner 32 optically combines output light L1 output from each of the plurality of laser devices 31. Specifically, inside the combiner 32, the optical fibers F respectively extending from the laser devices 31 are bundled into a single optical fiber (bundled into a single optical fiber by melt drawing), and the single optical fiber is fusion-spliced to one end of the optical fiber F10. The optical fiber F10 is an optical fiber that functions as a transmission medium and guides the output light L11 (light obtained by optically combining the output light L1 output from each of the laser devices 31 using the combiner 32). Further, the output light L11 guided by the optical fiber F10 is output from the output end X of the optical fiber F10.

The optical power monitoring device 13 is the same as the optical power monitoring device 13 shown in FIG. 1. However, as described above, since there is a fusion-splicing point inside the combiner 32, the optical power monitoring device 13 is disposed at a position a predetermined distance away from the fusion-splicing point inside the combiner 32 in a longitudinal direction of the optical fiber F (for example, a position separated by several centimeters (cm)). Specifically, the distance between the fusion-splicing point P and the optical power monitoring device 13 is set to a distance that satisfies the above-described expression (1).

While referring to the power of the reflected light L12 monitored by the optical power monitoring device 13, the control device 33 performs control of the plurality of laser devices 31 such that the power of the output light L11 output from the output end X is constant. When the power of the reflected light L2 monitored by the optical power monitoring device 13 exceeds a predefined threshold value, the control device 33 performs control such that an output of the laser device 31 is lowered to protect the laser device 31. Further, since operation of the laser system LS shown in FIG. 7 is substantially the same as the operation of the laser device 1 described in one or more embodiments above and the operation of the laser device 2 of one or more embodiments except that output light L1 output from each of the plurality of laser devices 31 is optically coupled by the combiner 32 and is output as L11, a description thereof will be omitted.

As described above, the laser system LS of one or more embodiments includes the same optical power monitoring device 13 as that included in the laser device 1 and the laser device 2 of described in one or more embodiments above, and performs the same calculation as described in one or more embodiments above by detecting Rayleigh scattered light generated inside the optical fiber F10. Therefore, in one or more embodiments, since the reflected light L12 can be monitored with high accuracy, the monitoring accuracy of the reflected light L12 can be improved.

As described above, in the embodiments described above, since a component corresponding to an output of the output light is excluded from a detection result (detection result of Rayleigh scattered light) obtained by the photodetector using the light detection characteristic information IF2 (information indicating a relationship between an output of the output light and a detection result of the photodetector) obtained in advance, monitoring accuracy of the reflected light can be improved with a simple configuration. Further, since the light detection characteristic information IF2 is used, quantitative reflected light detection is possible.

Further, in the embodiments described above, since an output of the output light is obtained using the current-light output characteristic information IF1 (information indicating a relationship between a current and an output of the output light) obtained in advance, it is possible to easily obtain the output of output light without requiring an additional configuration.

Also, in the embodiments described above, since the current-light output characteristic information IF1 and the light detection characteristic information IF2 which have been obtained in advance are stored in the storage unit, it is possible to monitor reflected light with high accuracy immediately after the apparatus is installed and operation is started.

Further, in the embodiments described above, since a calculation result of the calculation unit is corrected using a difference between the current-light output characteristic information IF1 stored in the storage unit and the newly obtained current-light output characteristic information IF1, it is possible to maintain the accuracy even when a change over time occurs in a relationship between the current and the light output.

Further, in the embodiments described above, since a portion at which a current changes rapidly is masked, erroneous detection can be inhibited.

Also, in the embodiments described above, since the photodetector is disposed at a position a predefined distance away from the splicing point of the optical fiber, an influence of the leakage light received by the photodetector can be reduced, and therefore it is possible to maintain monitoring accuracy.

Further, in the embodiments described above, it is possible to improve monitoring accuracy of reflected light input to the optical fiber laser device in which the excitation light source and the first and the second optical fibers are included.

Also, in the embodiments described above, when power of reflected light monitored exceeds a threshold value, since an output of the fiber laser device is lowered, it is possible to prevent an oscillation state from becoming unstable, and it is possible to prevent a situation in which the fiber laser fails from occurring.

Further, in the embodiments described above, since reflected light can also be monitored by each of the fiber laser devices, it is possible to specify an amount of reflected light input to each of the fiber laser devices.

While embodiments of the invention have been described as above, the invention is not limited to the above-described embodiments, and can be freely modified within the scope of the invention. For example, in the above-described embodiments, a case in which the optical fiber F1 is a single clad fiber including a core to which active elements are added and a cladding surrounding the core has been described. However, the invention can also be applied to a case in which the optical fiber F1 is a double clad fiber including a core to which active elements are added, an inner cladding surrounding the core, and an outer cladding surrounding the inner cladding.

Further, the optical power monitoring device of the invention is also applicable to laser devices other than the laser devices according to the above-described embodiments. For example, the optical power monitoring device can also be applied to a laser device in which a resonator, other than an optical fiber, is constituted such as a semiconductor laser (direct diode laser (DDL)) or a disc laser, and laser light emitted from the resonator is collected in an optical fiber.

DESCRIPTION OF REFERENCE NUMERALS 1, 2 Laser device
13 Optical power monitoring device
21 Photodetector
22 Calculation unit
31 Laser device
32 Combiner
33 Control device
EL Excitation light source
F, F1, F10 Optical fiber
IF1 Current-light output characteristic information
IF2 Light detection characteristic information
L1, L11 Output light
L2, L12 Reflected light
LS Laser system
M Storage unit
P Fusion-splicing point Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical power monitoring device that monitors power of input light reflected back into an optical fiber among output light output from the optical fiber, the optical power monitoring device comprising:
   a photodetector disposed by the optical fiber that detects Rayleigh scattered light generated by the input light and the output light that are guided by the optical fiber; and
   a calculator that performs a calculation to exclude a component that corresponds to an output of the output light detected by the photodetector using first information that indicates a relationship between:
      an output of the output light obtained in advance under a condition where the output light is not reflected, and
      the output of the output light detected by the photodetector.

2. The optical power monitoring device according to claim 1, wherein the calculator obtains an output of the output light based on a current supplied to an excitation light source using second information that indicates a relationship between:
   the current supplied to the excitation light source of the output light obtained in advance under the condition where the output light is not reflected, and
   a measured output of the output light based on the current supplied to the excitation light source.

3. The optical power monitoring device according to claim 2, wherein the calculator comprises a memory where the first information and the second information are stored.

4. The optical power monitoring device according to claim 3, wherein the calculator obtains a difference between:
   the second information that is newly obtained under the condition where the output light is not reflected, and
   the second information that is stored in the memory to correct a calculation result using the difference.

5. The optical power monitoring device according to claim 2, wherein the calculator masks a detection result of the photodetector in at least one of:
   a predetermined time after supply of a current to the excitation light source is started; and
   a predetermined time after the supply is stopped.

6. The optical power monitoring device according to claim 1, wherein when the optical fiber comprises a splicing point, the photodetector is disposed a predetermined distance away from the splicing point in a longitudinal direction of the optical fiber.

7. A laser device comprising:
   a transmission optical fiber as a transmission medium through which light is transmitted;
   the optical power monitoring device according to claim 1,
   wherein the optical power monitoring device monitors power of input light reflected back into the transmission optical fiber as the power of the input light reflected back into the optical fiber.

8. The laser device according to claim 7, further comprising:
   an excitation light source; and
   an amplification optical fiber as an amplification medium with respect to light that is output from the excitation light source, and
   the laser device is a fiber laser device that transmits light from the amplification optical fiber through the transmission optical fiber.

9. A laser system including:
   a plurality of laser devices;
   a multiplexing device that multiplexes light output from the plurality of laser devices; and
   an output optical fiber that guides light multiplexed in the multiplexing device,
   the laser system comprising:
      the optical power monitoring device according to claim 1,
      wherein the optical power monitoring device monitors power of input light reflected back into the output optical fiber as the power of the input light reflected back into the optical fiber.

10. The laser system according to claim 9, further comprising:
    a controller that controls lowering of an output of the plurality of laser devices when the power of the input light reflected back into the output optical fiber monitored by the optical power monitoring device exceeds a predetermined threshold value.

11. The laser system according to claim 9, wherein each of the plurality of laser devices comprises:
   a transmission optical fiber as a transmission medium through which light is transmitted; and
   the optical power monitoring device,
   wherein the optical power monitoring device monitors power of input light reflected back into the transmission optical fiber as the power of the input light reflected back into the optical fiber.

\* \* \* \* \*